Aug. 25, 1959  W. F. UNDERWOOD ET AL  2,901,358
METHOD FOR PRODUCING ARTIFICIAL FOOD CASING
Filed Feb. 25, 1958
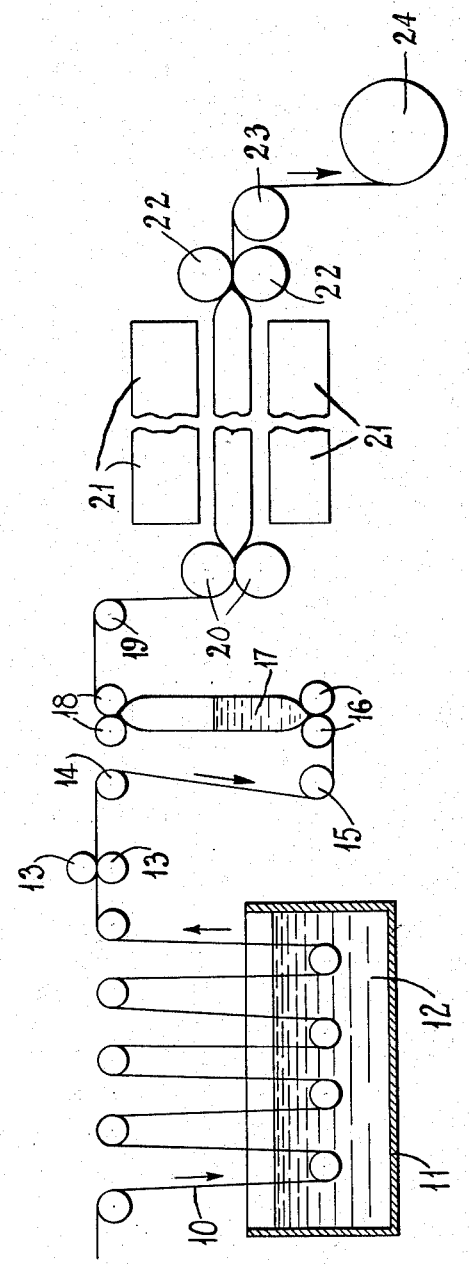
INVENTORS
WILLIAM F. UNDERWOOD
HOWARD L. LEVENTHAL
ATTORNEY

2,901,358
METHOD FOR PRODUCING ARTIFICIAL FOOD CASING

William F. Underwood, Oak Park, and Howard L. Leventhal, Melrose Park, Ill., assignors to Union Carbide Corporation, a corporation of New York Application February 25, 1958, Serial No. 717,476

12 Claims. (Cl. 99—176)

This invention relates to food casings and methods for preparing them. More particularly, the invention is directed to a method for preparing food casings which can be readily removed from food encased therein and to the food casing produced by said method.

Cellulosic food casings used in the sausage industry are multifunctional in that they can be used as containers during the processing of the product and as protective wrapping for the finished product. The casing is often removed from the sausage after processing and the sausage sliced and repacked into smaller units. When the casing is removed from the meat mass there is frequently a tendency for some meat to adhere to the casing and be torn from the sausage with the casing, thereby causing surface marring of the sausage. The marring may range from minor scuffing to severe scarring depending upon the type of meat product and conditions of processing and peeling.

It is an object of this invention to provide a method for producing a food casing which can be easily removed from the food mass encased therein.

Another object of this invention is to provide a food casing which can be easily removed from the food mass.

Other objects and advantages of the invention will become apparent hereinafter.

According to the present invention, the inner surface of a cellulose sausage casing is coated with a chemical composition containing functional groups capable of reacting with the cellulose and the casing is then dried to cause such reaction and to form a permanent bond between the composition and the casing.

The invention may be more readily understood by referring to the single figure, which schematically shows one embodiment of the invention.

In the single figure, a flattened, tubular, cellulosic sausage casing 10 after being formed and washed is glycerinated in its passage through tube 11 containing a glycerin-water solution 12. The rate of travel through the tube 11 and the concentration and temperature of the glycerin-water solution 12 determine the percentage of glycerin absorbed by the casing. This procedure is well known in the art.

Following the glycerination, the tubing passes between squeeze rolls 13 which minimize any solution carry over, and act as guide rolls to direct the casing to guide roll 14. After passing over guide rolls 14 and 15, the casing passes through a lower pair of driven squeeze rolls 16 and an upper pair of driven squeeze rolls 18. The chemical composition 17 is contained within the casing between squeeze rolls 16 and 18. The lower squeeze rolls 16 act as a seal to maintain the composition 17 inside the casing at the desired point of travel.

The pressure exerted on the casing by the upper squeeze rolls 18 prevents any excess carry over of the composition 17.

The chemical composition 17 is introduced into the casing by cutting the casing in two at a point between squeeze rolls 16 and 18 and inserting the desired amount of composition 17. The casing is then fed through squeeze rolls 18 and the two casing ends are tied together around a short length of a hollow rubber tubing connecting insert in such a manner that there is an uninterrupted flow of gas through the connection.

As the casing continuously passes between squeeze rolls 16 and 18, successive portions of the inside surface of the casing contact the chemical composition 17 and are coated therewith. The volume of composition will be decreased as the casing is coated. The rate of travel of the casing, the initial concentration of the composition 17 and the rate of exhaustion of the composition 17 are factors that determine the amount of composition with which the inside surface of the casing will be coated and the frequency with which the composition will require replenishing.

Following the coating of the inner surface of the casing and its passage through squeeze rolls 18, it is passed over guide roll 19, through driven squeeze rolls 20 and into a heating chamber 21, wherein it is dried to the proper moisture content. The casing is inflated by a bubble of air maintained in a relatively fixed position between squeeze rolls 20 and 22 by the sealing action of rolls 20 and 22. The heating chamber 21 can be any type of heating device which will dry the sausage casing to the proper moisture content. Circulating hot air is preferred.

After the casing passes out of the heating chamber 21 and through squeeze rolls 22, it passes over guide roll 23 and is wound up on reel 24.

It is obvious that the method of the invention admits of many apparatus arrangements other than that shown in the figure without departing from the principle of the invention.

Cellulosic sausage casings produced by the viscose process, the denitration of nitrocellulose or the deesterification of cellulose esters may be coated according to the invention. Other cellulosic materials, such as cellulose ethers like hydroxy ethyl cellulose, may also be coated. The use of a cellulosic casing containing an embedded paper web in which the fibers are bonded with regenerated cellulose or resins is preferred. In one method of producing such casings, viscose is applied to one or both sides of a tube formed by curving a thin, long-fibered paper strip about its longitudinal axis with overlapping longitudinal margins, and then the tubing is treated to coagulate and regenerate the viscose. A paper formed of hemp fibers bonded together with regenerated cellulose is preferred as the fibrous base tubing. Other non-woven webs, such as Yoshino paper, rice paper, hemp, rayon, cotton and nylon; and woven fabrics, such as muslin, marquisette, cheesecloth, organdy and voile may be used.

The sausage casing, after glycerination and prior to drying, is in the gel form. It is preferred to apply the composition to the sausage casing while it is in the gel form to assure a more uniform product.

The preferred chemical composition for coating sausage casings is a water-soluble chromium-stearic acid complex of the Werner type in which a trivalent nuclear chromium atom is coordinated with a stearic acid group. This composition can be properly called stearato chromic chloride. The suffix "ato" is added to the first portion of the name, "stearic acid," to indicate that it has become a functional acido group in the complex. This composition is to be distinguished from the normal chromic stearate which is insoluble in water.

The quantity of chemical composition needed to impart the desired peeling characteristics is important. An insufficient quantity does not improve the peeling properties while an excessive amount, in the case of bologna sausage making, causes fat pockets to separate on the surface of the sausage without appreciably further reducing the force necessary to strip the casing from the sausage. An improvement in peeling characteristics is obtained by coating the interior walls of the cellulosic sausage casing with an aqueous solution having a concentration of at least 0.1 percent by weight of stearato chromic chloride. The optimum quantity of coating for a particular use can easily be determined by those skilled in the art.

The tensile strength, transparency, elasticity and moisture permeability of the casing are substantially unchanged by the coating treatment described above.

It is preferred that the moisture content of the casing is reduced to not more than about 10% by weight following the coating step to get effective bonding of the coating composition with the interior wall of the casing. After the composition has reacted with the interior of the casing, the casing can be rewet without any loss in the effectiveness of its peeling characteristics.

To illustrate the invention the following examples are set forth but the invention is not limited in scope to these examples.

In the examples, regenerated cellulose casing containing a paper web embedded therein, commonly known as fibrous casing, was coated internally with the indicated compositions. The casings were then stuffed with a bologna meat emulsion of veal, pork, beef, dried skim milk powder, salt, spices, sodium nitrate and sodium nitrite and then processed as known in the art by heating and smoking to an internal temperature of 147° F.–150° F. After smoking, the sausage was hot showered, cold showered and stored overnight at 30° F. Stripping tests were run the morning after the processing.

The force required to strip the casing from the sausage was determined by making two cuts in the casing, 1" apart, parallel to the longitudinal axis of the sausage and measuring the amount of force necessary to pull the 1" wide strip from the sausage. This was done by making a third cut perpendicularly across the two parallel cuts, freeing a segment of the strip of casing and measuring the average force necessary to pull the rest of the 1" strip from the sausage with a spring loaded scale hooked to the casing with an alligator clip. A measure of this force is an indication of the tendency for the casing to adhere to the meat mass.

EXAMPLES I TO V

A solution of 30% by weight of stearato chromic chloride was diluted with water to the indicated concentrations and placed inside the gel casing after glycerination and prior to drying as hereinbefore described and illustrated in the figure. After the casing was internally coated it was passed, in the inflated state, through a circulating hot air dryer, wherein the air was maintained at 100° C.–110° C., and dried to a final moisture level of 4% to 6%. The casings selected for stripping tests were selected from those coated during the first 5 minutes of each run to minimize changes in the coating concentration. The results are shown in Table 1.

Table 1

| Example No. | Percent by weight of Stearato Chromic Chloride | Stripping Force In Pounds |
|---|---|---|
| I | 0.0 (Control) | 0.56 |
| II | 0.50 | 0.32 |
| III | 0.75 | 0.37 |
| IV | 1.00 | 0.10 |
| V | 1.25 | 0.13 |

The above examples show that coating the inside of a food casing with a chemical composition of the type indicated lessens the amount of force required to strip the casing from the food encased therein and therefore the tendency of the food to adhere to the casing and be removed therewith is lessened. The examples show that certain concentrations of the chemical composition are to be preferred, although the invention will operate over a wide range of concentrations. The optimum concentration of chemical composition will vary with other prevailing conditions and can be readily determined by those skilled in the art by simple empirical tests.

The food casings produced by the method described herein are admirably suited for use in the processing and packaging of meat products, for example, sausages and processed meats such as bologna, beer sausage, salami, summer sausage, dry sausage, thuringer, frankfurters, hams, Canadian bacon, butts, pork butts, picnic sausage, etc. The method is not limited to casings for meat products but may be used as well with casings for cheese and other foods which require processing or distribution in casings.

"Skinless" frankfurters may also be produced by the method of the present invention by treating the inside of the cellulosic casings in which the frankfurters are processed by smoking and heating and then removing the casings from the cured frankfurters. Alternatively, the cured frankfurter may be distributed to the ultimate consumer before removing the coated casing. The lack of adhesion of the casing to the frankfurter will allow the consumer to peel off the casing without scarring the surface of the meat.

What is claimed is:

1. A method of producing an artificial meat casing easily separable from the meat mass encased therein, which comprises coating the wall of said casing which is to be nearest said meat mass with stearato chromic chloride, and thereafter drying said coated casing.

2. A method of producing a cellulosic food casing for meat products which casing is easily separable from the meat mass encased therein, which comprises coating the interior wall of said casing with stearato chromic chloride, and thereafter drying said internally coated casing.

3. A method of producing an artificial sausage casing easily separable from the sausage mass encased therein, which comprises coating the interior wall of said casing with stearato chromic chloride, and thereafter drying said internally coated casing.

4. A method of producing an artificial sausage casing easily separable from the sausage mass encased therein, which comprises coating the interior wall of said casing with an aqueous solution of stearato chromic chloride, and thereafter drying said internally coated casing to a moisture content of not more than about 10% by weight.

5. A method of producing a cellulosic food casing having a reduced tendency to adhere to the food mass encased therein, which comprises coating the interior wall of said sausage casing with at least an 0.1 percent by weight solution in water of stearato chromic chloride, and thereafter drying said internally coated casing to a moisture content of not more than about 10% by weight.

6. A method of producing a cellulosic sausage casing having a paper web embedded therein, which comprises coating the interior walls of said cellulosic sausage casings with an aqueous solution of stearato chromic chloride, and thereafter drying said internally coated casing to effect a permanent bond between said casing and said coating.

7. A method of producing a cellulosic sausage casing having a paper web embedded therein, which comprises coating the interior walls of said cellulosic sausage casing with at least an 0.1 percent by weight solution in water of stearato chromic chloride, and thereafter drying said internally coated casing to effect a permanent bond between said casing and said coating.

8. A method of producing a cellulosic sausage casing having a paper web embedded therein, which comprises coating the interior walls of said cellulosic sausage casing with an aqueous solution of stearato chromic chloride to said interior sausage casing wall by drying said casing to a moisture content of not more than about 10% by weight.

9. A method of producing a cellulosic sausage casing easily separable from the sausage mass encased therein, which comprises coating the interior wall of said casing while it is in the gel form with stearato chromic chloride, and thereafter drying said internally coated casing.

10. A cellulosic food casing characterized in that the wall of said casing which is to be nearest the food is chemically combined with a stearato chromic chloride composition.

11. A substantially tubular cellulosic food casing characterized in that the inner wall of said casing is chemically combined with a stearato chromic chloride composition.

12. The cellulosic food casing of claim 10 characterized in that a paper web is embedded therein.

References Cited in the file of this patent
UNITED STATES PATENTS

| | | |
|---|---|---|
| 2,273,040 | Iler | Feb. 17, 1942 |
| 2,289,049 | Schnecko | July 7, 1942 |
| 2,524,803 | Iler | Oct. 10, 1950 |
| 2,709,138 | Weingand et al. | May 24, 1955 |
| 2,845,357 | Milne | July 29, 1958 |